United States Patent
Armbruster et al.

(10) Patent No.: US 9,348,026 B2
(45) Date of Patent: May 24, 2016

(54) DEVICE AND METHOD FOR DETERMINATION OF A POSITION OF AN OBJECT BY MEANS OF ULTRASONIC WAVES

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: ALLTEC ANGEWANDTE LASERLICHT TECHNOLOGIE GmbH, Selmsdorf (DE)

( * ) Notice: Subject to any disclaimer, the term of this patent is extended or adjusted under 35 U.S.C. 154(b) by 150 days.

(21) Appl. No.: 14/342,494

(22) PCT Filed: Jul. 19, 2012

(86) PCT No.: PCT/EP2012/003061
§ 371 (c)(1),
(2), (4) Date: Mar. 3, 2014

(87) PCT Pub. No.: WO2013/034206
PCT Pub. Date: Mar. 14, 2013

(65) Prior Publication Data
US 2014/0204713 A1    Jul. 24, 2014

(30) Foreign Application Priority Data
Sep. 5, 2011  (EP) .................... 11007177

(51) Int. Cl.
*G01S 15/06* (2006.01)
*G01S 15/02* (2006.01)
*G01S 15/04* (2006.01)

(52) U.S. Cl.
CPC ............. *G01S 15/06* (2013.01); *G01S 15/025* (2013.01); *G01S 15/04* (2013.01)

(58) Field of Classification Search
CPC ........ G01S 15/025; G01S 15/04; G01S 15/06
See application file for complete search history.

(56) References Cited

U.S. PATENT DOCUMENTS 2,359,780 A    10/1944   Glenn
3,465,358 A     9/1969   Bridges
(Continued)

FOREIGN PATENT DOCUMENTS

DE    4029187 A1    3/1992
DE    4212390 A1    10/1993
(Continued)

OTHER PUBLICATIONS

U.S. Appl. No. 14/342,508, Final Office Action dated Dec. 10, 2014, 23 pages.
(Continued)

*Primary Examiner* — Daniel Pihulic
(74) *Attorney, Agent, or Firm* — Hoffman Warnick LLC

(57) ABSTRACT

An apparatus for marking an object includes a marking unit for marking the object with a laser beam, a transporting device for transporting the object and a device for determination of a position of the object by means of ultrasonic waves originating from the object. A pulsed laser beam is directed to the object to cause vibrations at a surface of the object, by which vibrations the object is excited to generate ultrasonic waves.

9 Claims, 1 Drawing Sheet

(56) References Cited

U.S. PATENT DOCUMENTS

| | | |
|---|---|---|
| 3,533,012 A | 10/1970 | Johnson et al. |
| 3,564,449 A | 2/1971 | Muller et al. |
| 3,564,452 A | 2/1971 | Rempel |
| 3,596,202 A | 7/1971 | Patel |
| 3,602,837 A | 8/1971 | Goldsborough |
| 3,609,584 A | 9/1971 | Stitch et al. |
| 3,628,175 A | 12/1971 | Rigden |
| 3,638,137 A | 1/1972 | Krupke |
| 3,646,476 A | 2/1972 | Barker et al. |
| 3,705,999 A | 12/1972 | Hermann et al. |
| 3,721,915 A | 3/1973 | Reilly |
| 3,801,929 A | 4/1974 | Kawasaki |
| 3,851,272 A | 11/1974 | Shull et al. |
| 3,900,804 A | 8/1975 | Davis et al. |
| 3,919,663 A | 11/1975 | Caruolo et al. |
| 3,946,233 A | 3/1976 | Erben et al. |
| 4,053,851 A | 10/1977 | Krupke |
| 4,122,853 A | 10/1978 | Smith |
| 4,125,755 A | 11/1978 | Plamquist |
| 4,131,782 A | 12/1978 | Einstein et al. |
| 4,189,687 A | 2/1980 | Wieder et al. |
| 4,270,845 A | 6/1981 | Takizawa et al. |
| 4,376,496 A | 3/1983 | Sedam et al. |
| 4,467,334 A | 8/1984 | Anzai |
| 4,477,907 A | 10/1984 | McMahan |
| 4,500,996 A | 2/1985 | Sasnett et al. |
| 4,500,998 A | 2/1985 | Kuwabara et al. |
| 4,512,639 A | 4/1985 | Roberts et al. |
| 4,554,666 A | 11/1985 | Altman |
| 4,596,018 A | 6/1986 | Gruber et al. |
| 4,614,913 A | 9/1986 | Honeycutt et al. |
| 4,652,722 A | 3/1987 | Stone et al. |
| 4,655,547 A | 4/1987 | Heritage et al. |
| 4,660,209 A | 4/1987 | Osada et al. |
| 4,665,607 A | 5/1987 | Ressencourt |
| 4,672,620 A | 6/1987 | Slusher et al. |
| 4,689,467 A | 8/1987 | Inoue |
| 4,720,618 A | 1/1988 | Stamer et al. |
| 4,727,235 A | 2/1988 | Stamer et al. |
| 4,744,090 A | 5/1988 | Freiberg |
| 4,770,482 A | 9/1988 | Sweeney et al. |
| 4,779,278 A | 10/1988 | McKinney |
| 4,819,246 A | 4/1989 | Aiello et al. |
| 4,831,333 A | 5/1989 | Welch |
| 4,845,716 A | 7/1989 | Poehler et al. |
| 4,846,550 A | 7/1989 | Schuma et al. |
| 4,856,007 A | 8/1989 | Weiss |
| 4,858,240 A | 8/1989 | Pohler et al. |
| 4,907,240 A | 3/1990 | Klingel |
| 4,912,718 A | 3/1990 | Klingel |
| 4,953,176 A | 8/1990 | Ekstrand |
| 4,958,900 A | 9/1990 | Ortiz, Jr. |
| 4,991,149 A | 2/1991 | Maccabee |
| 5,001,718 A | 3/1991 | Burrows et al. |
| 5,012,259 A | 4/1991 | Hattori et al. |
| 5,023,886 A | 6/1991 | Hobart et al. |
| 5,052,017 A | 9/1991 | Hobart et al. |
| 5,065,405 A | 11/1991 | Laakmann et al. |
| 5,097,481 A | 3/1992 | Fritzsche et al. |
| 5,109,149 A | 4/1992 | Leung |
| 5,115,446 A | 5/1992 | Von Borstel et al. |
| 5,162,940 A | 11/1992 | Brandelik |
| 5,199,042 A | 3/1993 | Papetti et al. |
| 5,214,658 A | 5/1993 | Ostler |
| 5,229,573 A | 7/1993 | Stone et al. |
| 5,229,574 A | 7/1993 | Stone |
| 5,268,921 A | 12/1993 | McLellan |
| 5,274,661 A | 12/1993 | von Gunten et al. |
| 5,294,774 A | 3/1994 | Stone |
| 5,337,325 A | 8/1994 | Hwang |
| 5,339,737 A | 8/1994 | Lewis et al. |
| 5,386,427 A | 1/1995 | Zayhowski |
| 5,386,431 A | 1/1995 | Tulip |
| 5,422,906 A | 6/1995 | Karasaki et al. |
| 5,426,659 A | 6/1995 | Sugiyama et al. |
| 5,431,199 A | 7/1995 | Benjay et al. |
| 5,504,763 A | 4/1996 | Bischel et al. |
| 5,506,858 A | 4/1996 | Takenaka et al. |
| 5,544,186 A | 8/1996 | Sauer et al. |
| 5,550,853 A | 8/1996 | Ostler |
| 5,568,306 A | 10/1996 | Mandel |
| 5,572,538 A | 11/1996 | Saitoh et al. |
| 5,592,504 A | 1/1997 | Cameron |
| 5,596,594 A | 1/1997 | Egawa |
| RE35,446 E | 2/1997 | Stone |
| 5,608,754 A | 3/1997 | Murakami et al. |
| 5,646,907 A | 7/1997 | Maccabee |
| 5,653,900 A | 8/1997 | Clement et al. |
| 5,659,561 A | 8/1997 | Torruellas et al. |
| 5,670,064 A | 9/1997 | Nakata |
| 5,682,262 A | 10/1997 | Wefers et al. |
| 5,689,363 A | 11/1997 | Dane et al. |
| 5,706,305 A | 1/1998 | Yamane et al. |
| 5,720,894 A | 2/1998 | Neev et al. |
| 5,729,568 A | 3/1998 | Opower et al. |
| 5,767,477 A | 6/1998 | Sutter, Jr. |
| 5,808,268 A | 9/1998 | Balz et al. |
| 5,815,523 A | 9/1998 | Morris |
| 5,837,962 A | 11/1998 | Overbeck |
| 5,864,430 A | 1/1999 | Dickey et al. |
| 5,884,588 A | 3/1999 | Ap et al. |
| 5,929,337 A * | 7/1999 | Collins ................ B65B 57/00 209/590 |
| 5,982,803 A | 11/1999 | Sukhman et al. |
| 6,050,486 A | 4/2000 | French et al. |
| 6,057,871 A | 5/2000 | Peterson |
| 6,064,034 A | 5/2000 | Rieck |
| 6,069,843 A | 5/2000 | DiMarzio et al. |
| 6,122,562 A | 9/2000 | Kinney et al. |
| 6,141,030 A | 10/2000 | Fujita et al. |
| 6,180,913 B1 | 1/2001 | Kolmeder et al. |
| 6,181,728 B1 | 1/2001 | Cordingley et al. |
| 6,192,061 B1 | 2/2001 | Hart et al. |
| 6,210,401 B1 | 4/2001 | Lai |
| 6,229,940 B1 | 5/2001 | Rice et al. |
| 6,256,121 B1 | 7/2001 | Lizotte et al. |
| 6,263,007 B1 | 7/2001 | Tang |
| 6,269,111 B1 | 7/2001 | Mori et al. |
| 6,303,930 B1 | 10/2001 | Hagiwara |
| 6,310,701 B1 | 10/2001 | Lizotte |
| 6,313,957 B1 | 11/2001 | Heemstra et al. |
| 6,341,042 B1 | 1/2002 | Matsunaka et al. |
| 6,356,575 B1 | 3/2002 | Fukumoto |
| 6,370,884 B1 | 4/2002 | Kelada |
| 6,420,675 B1 | 7/2002 | Lizotte et al. |
| 6,421,159 B1 | 7/2002 | Sutter et al. |
| 6,476,350 B1 | 11/2002 | Grandjean et al. |
| 6,495,795 B2 | 12/2002 | Gortler et al. |
| 6,512,781 B1 | 1/2003 | Von Borstel et al. |
| 6,539,045 B1 | 3/2003 | Von Borstel et al. |
| 6,621,838 B2 | 9/2003 | Naito et al. |
| 6,661,568 B2 | 12/2003 | Hollemann et al. |
| 6,690,702 B1 | 2/2004 | Ohmi et al. |
| 6,693,930 B1 | 2/2004 | Chuang et al. |
| 6,768,765 B1 | 7/2004 | Schroeder et al. |
| 6,791,592 B2 | 9/2004 | Assa et al. |
| 6,829,000 B2 | 12/2004 | Assa et al. |
| 6,856,509 B2 | 2/2005 | Lin |
| 6,861,614 B1 | 3/2005 | Tanabe et al. |
| 6,898,216 B1 | 5/2005 | Kleinschmidt |
| 6,915,654 B2 | 7/2005 | Johnson |
| 6,944,201 B2 | 9/2005 | Bunting et al. |
| 7,046,267 B2 | 5/2006 | Franklin et al. |
| 7,058,100 B2 | 6/2006 | Vetrovec et al. |
| 7,167,194 B2 | 1/2007 | Assa et al. |
| 7,170,251 B2 | 1/2007 | Huang |
| 7,190,144 B2 | 3/2007 | Huang |
| 7,200,464 B2 | 4/2007 | Nussbaum et al. |
| 7,291,999 B2 | 11/2007 | Huang |
| 7,331,512 B2 | 2/2008 | Caiger |
| 7,334,744 B1 | 2/2008 | Dawson |
| 7,346,427 B2 | 3/2008 | Hillam et al. |
| 7,394,479 B2 | 7/2008 | Assa et al. |
| 7,421,308 B2 | 9/2008 | Nussbaum et al. |

(56) References Cited

U.S. PATENT DOCUMENTS

| | | |
|---|---|---|
| 7,496,831 B2 | 2/2009 | Dutta et al. |
| 7,521,649 B2 | 4/2009 | Umetsu et al. |
| 7,521,651 B2 | 4/2009 | Gross et al. |
| 7,543,912 B2 | 6/2009 | Anderson et al. |
| 7,565,705 B2 | 7/2009 | Elkins et al. |
| 8,164,025 B1 | 4/2012 | Kunas et al. |
| 8,168,921 B1 | 5/2012 | Kunas et al. |
| 8,212,178 B1 | 7/2012 | Kunas et al. |
| 8,263,898 B2 | 9/2012 | Alber |
| 2001/0030983 A1 | 10/2001 | Yuri et al. |
| 2001/0045418 A1 | 11/2001 | Brandinger et al. |
| 2002/0021730 A1 | 2/2002 | Schroeder et al. |
| 2002/0071466 A1 | 6/2002 | Zeller |
| 2002/0080845 A1 | 6/2002 | Schulz et al. |
| 2002/0114362 A1 | 8/2002 | Vogler et al. |
| 2002/0162825 A1 | 11/2002 | Lizotte et al. |
| 2002/0196534 A1 | 12/2002 | Lizotte et al. |
| 2003/0010420 A1 | 1/2003 | Morrow |
| 2003/0014895 A1 | 1/2003 | Lizotte |
| 2003/0019854 A1 | 1/2003 | Gross et al. |
| 2003/0123040 A1 | 7/2003 | Almogy |
| 2003/0147443 A1 | 8/2003 | Backus |
| 2003/0168434 A1 | 9/2003 | Gross et al. |
| 2003/0174741 A1 | 9/2003 | Weingarten et al. |
| 2003/0219056 A1 | 11/2003 | Yager et al. |
| 2003/0219094 A1 | 11/2003 | Basting et al. |
| 2004/0021054 A1 | 2/2004 | Bennett |
| 2004/0027630 A1 | 2/2004 | Lizotte |
| 2004/0028108 A1 | 2/2004 | Govorkov et al. |
| 2004/0066825 A1 | 4/2004 | Hayashikawa et al. |
| 2004/0119979 A1 | 6/2004 | Duarte et al. |
| 2004/0179570 A1 | 9/2004 | Vitruk et al. |
| 2004/0202220 A1 | 10/2004 | Hua et al. |
| 2004/0228004 A1 | 11/2004 | Sercel et al. |
| 2004/0232125 A1 | 11/2004 | Clauer et al. |
| 2005/0013328 A1 | 1/2005 | Jurgensen |
| 2005/0056626 A1 | 3/2005 | Gross et al. |
| 2005/0059265 A1 | 3/2005 | Im |
| 2005/0068538 A1 | 3/2005 | Rao et al. |
| 2005/0092722 A1 | 5/2005 | Dane et al. |
| 2005/0094684 A1 | 5/2005 | Hermann et al. |
| 2005/0094697 A1 | 5/2005 | Armier et al. |
| 2005/0107773 A1 | 5/2005 | Bergt et al. |
| 2005/0111496 A1 | 5/2005 | Reeder et al. |
| 2005/0111500 A1 | 5/2005 | Harter et al. |
| 2005/0111514 A1 | 5/2005 | Matsumoto et al. |
| 2005/0157762 A1 | 7/2005 | DeMaria et al. |
| 2005/0190809 A1 | 9/2005 | Peterson et al. |
| 2005/0202611 A1 | 9/2005 | Mitsuhashi et al. |
| 2005/0205778 A1 | 9/2005 | Kitai et al. |
| 2005/0220164 A1 | 10/2005 | Mori et al. |
| 2005/0226286 A1 | 10/2005 | Liu et al. |
| 2005/0226287 A1 | 10/2005 | Shah et al. |
| 2006/0044981 A1 | 3/2006 | Egawa et al. |
| 2006/0061854 A1 | 3/2006 | Dane et al. |
| 2006/0092522 A1 | 5/2006 | Lizotte |
| 2006/0092995 A1 | 5/2006 | Frankel et al. |
| 2006/0114947 A1 | 6/2006 | Morita |
| 2006/0114956 A1 | 6/2006 | Sandstrom et al. |
| 2006/0161381 A1 | 7/2006 | Jetter |
| 2006/0191063 A1 | 8/2006 | Elkins et al. |
| 2006/0227841 A1 | 10/2006 | Savich |
| 2006/0245084 A1 | 11/2006 | Brustle et al. |
| 2006/0249491 A1 | 11/2006 | Jurgensen |
| 2006/0266742 A1 | 11/2006 | Hall et al. |
| 2006/0287697 A1 | 12/2006 | Lennox |
| 2007/0029289 A1 | 2/2007 | Brown |
| 2007/0030875 A1 | 2/2007 | Takazane et al. |
| 2007/0086493 A1 | 4/2007 | Apolonski et al. |
| 2007/0098024 A1 | 5/2007 | Mitchell |
| 2007/0138151 A1 | 6/2007 | Tanaka et al. |
| 2007/0177260 A1 | 8/2007 | Kuppenheimer et al. |
| 2007/0205186 A1 | 9/2007 | Kitai et al. |
| 2007/0235458 A1 | 10/2007 | Hewkin |
| 2007/0247499 A1 | 10/2007 | Anderson et al. |
| 2007/0295974 A1 | 12/2007 | Fontanella et al. |
| 2008/0042042 A1 | 2/2008 | King et al. |
| 2008/0043799 A1 | 2/2008 | Egawa et al. |
| 2008/0094636 A1 | 4/2008 | Jin et al. |
| 2008/0253415 A1 | 10/2008 | Livingston |
| 2008/0253417 A1 | 10/2008 | Livingston |
| 2008/0279247 A1 | 11/2008 | Scholz et al. |
| 2008/0297912 A1 | 12/2008 | Baldwin |
| 2009/0010285 A1 | 1/2009 | Dubois et al. |
| 2009/0027753 A1 | 1/2009 | Lizotte |
| 2009/0185176 A1 | 7/2009 | Livingston et al. |
| 2009/0185590 A1 | 7/2009 | Livingston |
| 2009/0188901 A1 | 7/2009 | Dantus |
| 2009/0207478 A1 | 8/2009 | Oron et al. |
| 2009/0245318 A1 | 10/2009 | Clifford, Jr. |
| 2009/0312676 A1 | 12/2009 | Rousso et al. |
| 2009/0323739 A1 | 12/2009 | Elliott et al. |
| 2009/0323753 A1 | 12/2009 | Gmeiner et al. |
| 2010/0132817 A1 | 6/2010 | Hewkin |
| 2010/0206882 A1 | 8/2010 | Wessels et al. |
| 2010/0220750 A1 | 9/2010 | Brownell |
| 2010/0254415 A1 | 10/2010 | Oh et al. |
| 2011/0032602 A1 | 2/2011 | Rothenberg |
| 2011/0032603 A1 | 2/2011 | Rothenberg |
| 2011/0032604 A1 | 2/2011 | Rothenberg et al. |
| 2011/0043899 A1 | 2/2011 | Erlandson |
| 2011/0097906 A1 | 4/2011 | Kwon et al. |
| 2011/0102537 A1 | 5/2011 | Griffin et al. |
| 2011/0127241 A1 | 6/2011 | Rumsby |
| 2011/0127697 A1 | 6/2011 | Milne |
| 2011/0128500 A1 | 6/2011 | Bille |
| 2011/0227972 A1 | 9/2011 | Taniguchi et al. |
| 2011/0253690 A1 | 10/2011 | Dane et al. |
| 2011/0255088 A1 | 10/2011 | Dane et al. |
| 2011/0259631 A1 | 10/2011 | Rumsby |
| 2011/0266264 A1 | 11/2011 | Rumsby |
| 2011/0286480 A1 | 11/2011 | Bayramian |
| 2012/0106083 A1 | 5/2012 | Toftloekke et al. |
| 2014/0204713 A1 * | 7/2014 | Armbruster ........... G01S 15/025 367/99 |
| 2014/0224778 A1 | 8/2014 | Armbruster et al. |

FOREIGN PATENT DOCUMENTS

| | | | |
|---|---|---|---|
| DE | 10125447 A1 | 1/2002 | |
| DE | EP 2565673 B1 * | 11/2013 | ............ G01S 15/025 |
| EP | 0157546 A2 | 10/1985 | |
| EP | 0427229 A3 | 5/1991 | |
| EP | 1184946 A1 | 3/2002 | |
| GB | 1495477 A | 12/1977 | |
| GB | 2211019 A | 6/1989 | |
| GB | 2249843 A | 5/1992 | |
| GB | 2304641 A | 3/1997 | |
| JP | 63094695 A | 4/1988 | |
| JP | 5129678 A | 5/1993 | |
| JP | 2001276986 A | 10/2001 | |
| JP | 2007032869 A | 2/2007 | |
| JP | 2007212118 A | 8/2007 | |
| JP | 2011156574 A | 8/2011 | |
| WO | 0046891 A1 | 8/2000 | |
| WO | 0107865 A2 | 2/2001 | |
| WO | 0243197 A2 | 5/2002 | |

OTHER PUBLICATIONS

U.S. Appl. No. 14/342,493, Office Action dated Nov. 19, 2014.
U.S. Appl. No. 14/342,510, Office Action dated Aug. 1, 2014.
U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
U.S. Appl. No. 14/342,503, Final Office Action dated Dec. 18, 2014, 22 pages.
Final Office Action for U.S. Appl. No. 14/342,487, dated Feb. 2, 2015, 31 pages.
Notice of Allowance and Fee(s) Due for U.S. Appl. No. 14/342,510, dated Feb. 20, 2015, 20 pages.
Notice of Allowance and Fee(s) Due for U.S. Appl. No. 14/342,503, dated Mar. 17, 2015, 11 pages.

(56) References Cited

OTHER PUBLICATIONS

Notice of Allowance and Fee(s) Due for U.S. Appl. No. 14/342,508, dated Apr. 1, 2015, 15 pages.
Notice of Allowance and Fee(s) Due for U.S. Appl. No. 14/342,483, dated Apr. 2, 2015, 26 pages.
Final Office Action for U.S. Appl. No. 14/342,493, dated Apr. 21, 2015, 25 pages.
International Application No. PCT/EP2012/003073, Preliminary Report on Patentability, Sep. 26, 2013, 14 pages.
International Application No. PCT/EP2012/003072, Preliminary Report on Patentability, Mar. 12, 2014, 7 pages.
International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, A633, Webe-0117, Dec. 18, 2012, 8 pages.
International Application No. PCT/EP2012/003072, Search Report and Written Opinion, Oct. 8, 2012, 11 pages.
International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.
International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.
International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.
International Application No. PCT/EP2012/003061, Search Report and Written Opinion, Sep. 10, 2012, 9 pages.
Office Action for U.S. Appl. No. 14/342,487, dated Jul. 24, 2015, 17 pages.
Notice of Allowance and Fee(s) Due for U.S. Appl. No. 14/342,493, dated Jun. 24, 2015, 11 pages.
Office Action for U.S. Appl. No. 14/342,499, dated Oct. 6, 2015, 77 pages.
Notice of Allowance and Fee(s) Due for U.S. Appl. No. 14/342,487, dated Nov. 23, 2015, 47 pages.
Office Action for U.S. Appl. No. 14/342,481, dated Oct. 6, 2015, 77 pages.
Office Action for U.S. Appl. No. 14/342,477, dated Oct. 7, 2015, 74 pages.
Office Action for U.S. Appl. No. 14/342,495, dated Oct. 6, 2015, 77 pages.

* cited by examiner

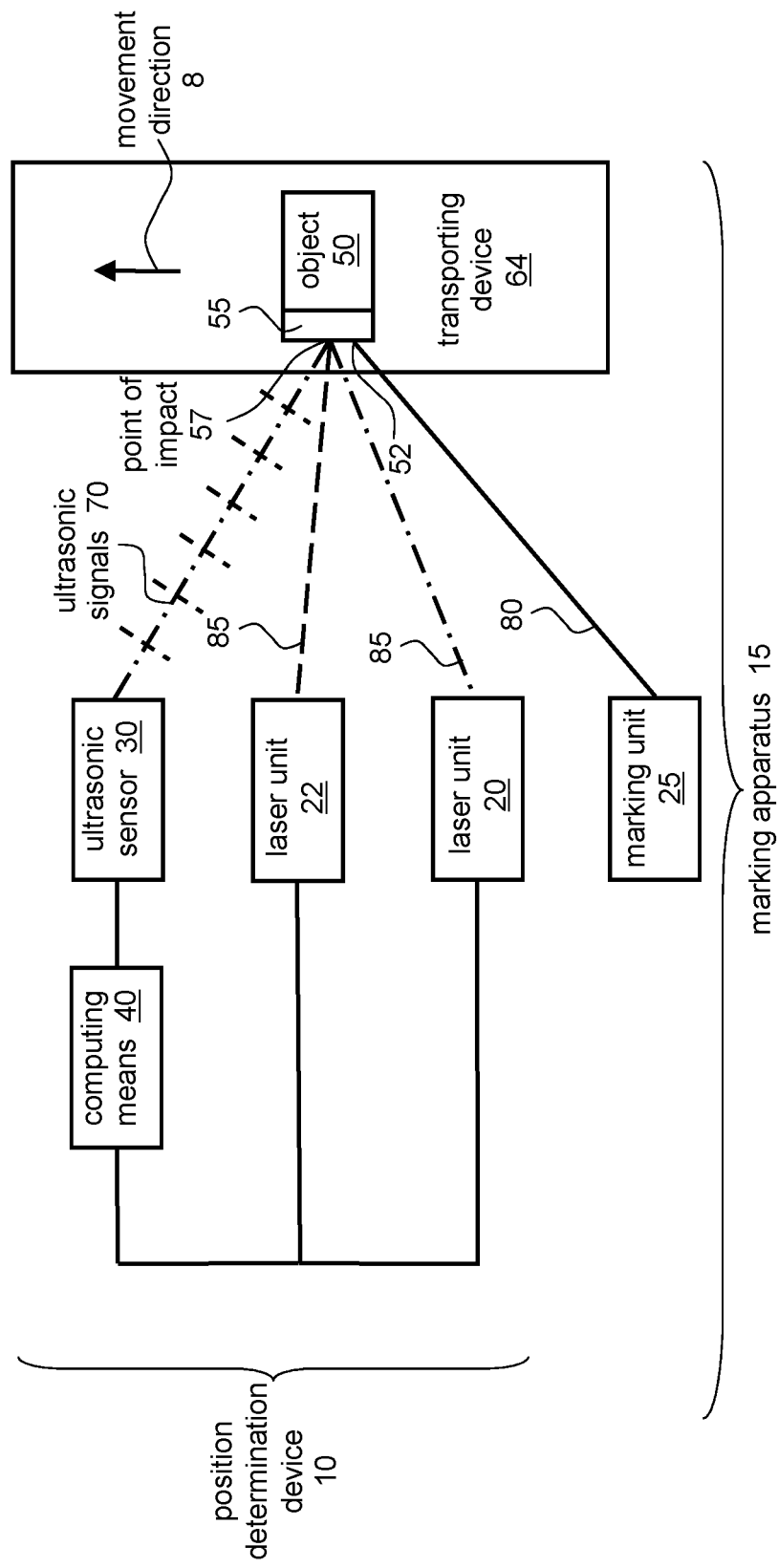

DEVICE AND METHOD FOR DETERMINATION OF A POSITION OF AN OBJECT BY MEANS OF ULTRASONIC WAVES

FIELD OF THE INVENTION

The present invention relates to a device for determination of a position of an object.

The invention further relates to a method for determination of a position of an object by means of ultrasonic waves. The device comprises at least one ultrasonic sensor for receiving ultrasonic signals from the object and computing means for computing the position of the object based on the received ultrasonic signals.

RELATED ART

It is well known to determine the distance to an object by means of ultrasonic signals. The principle technique employed in ultrasonic distance measurement is to transmit an ultrasonic pulse into the operating medium and measure the elapsed time between the time of transmission and the time of receipt of an echo from a distance target. Among a plurality of application possibilities ultrasonic distance measurements can be used in marking devices by which for example at average filling lines the single bottles are marked with a barcode. For applying a well readable barcode by means of a laser device it may be essential to determine the position of the object to be marked precisely.

Normally, the object is moved relative to the marking apparatus on a conveyor belt. Superposition of the ultrasonic signals reflected by the moving objects can cause difficulties to determine the position of a single object correctly, especially because the speed of the object on the conveyor belt relative to the marking apparatus should be as high as possible. A further problem can occur by using common ultrasonic transducers performing the dual function of transmitter and receiver. Thereby the ultrasonic transducer can not be used for receiving signals instantaneously after switching off the excitation or transmission voltage, because the piezo-electric crystal has a finite decay time. The amount of distance measurement can be performed within a certain time interval is therefore limited due to the inability of the transducer element to transmit and receive simultaneously.

U.S. Pat. No. 5,646,907 A discloses a method and system provided on a floating platform for detecting objects at or below a surface of a body of water. A high-power beam is directed towards the water's surface and when it strikes an object floating on the water's surface or below the water's surface, pressure pulses are generated at either the object's surface or the water's surface. The pressure pulses cause characteristic acoustic returns in the water which are detected by an underwater acoustic detector to locate the objects and possibly classify them.

SUMMARY OF THE INVENTION

This objective is solved with a device for determination of a position.

Preferred embodiments are given in the following description, in particular in connection with the attached FIGURE.

Preferred embodiments are given in the dependent claims as well as in the following description, in particular in connection with the attached FIGURE.

According to the invention, the device for determination of a position of an object of the above mentioned kind is characterized in that at least one laser unit for generating a pulse laser beam is provided, said pulsed laser beam being directed to the object and adapted to cause at a surface of the object vibrations, by which the object is excited to generate ultrasonic signals.

It can be regarded as an idea of the invention to generate the ultrasonic signal directly at the object whose position is to be determined. The object itself becomes an ultrasonic transmitter element without any electro acoustic transducer elements.

It can be achieved by the opto-acoustic effect, wherein the energy of the laser beam impinging on the surface of said object is absorbed by a local region at the surface.

This can lead to at least one of the following effects depending on the characteristics of the hit object, in particular of its surface.

The local region can heat up and cause thermal expansions by which vibrations are generated. As a result ultrasonic waves are emitted by the object, which can be detected by the ultrasonic sensor.

The vibrations may not be restricted to the local region, they even can spread on a major part of the object, which leads to more intensive emission of ultra sonics signals. Furtheron it is also possible that the impact of the pulsed laser beam can cause single particles ejecting out of the surface. Thereby short and intensive ultrasonic signals can be generated.

The characteristics of the pulsed laser beam can be adjusted to the object and to its surface condition or to other circumstances with respect to the irradiation time, the energy of a single laser pulse and the frequency of the pulse sequence of the laser beam for example.

In some cases, no additional ultrasonic transmission units are necessary. Furtheron superpositions of the echo signals reflected by different objects are avoided what normally would be happen if a common ultrasonic transmission unit is used.

The transducer element and ultrasonic element respectively, can be run in the receiving mode exclusively, which enables the positioning of objects moved by a conveyor belt even at high throughputs of said objects, because of the absent decay times between sending and receiving of the transducer element.

The objects can be of any generally known products, such as glass bottles, piece of metals, plastics, food, or other materials like papers and cardboards. Therefore the positioning of objects, in the above described manner moved by a conveyor belt used in marking devices which enables a correct positioning even at high throughput of said objects.

The at least one laser unit for generating said pulsed laser beam is not determined by a certain kind of laser types. Preferably a gas laser or a solid state laser may be used, in particular a $CO_2$ or a Nd:YAG laser respectively.

In an embodiment of the inventive device, the at least one laser unit is designed for generating more than one laser beam wherein the frequency of the light waves of said laser beams differ from each other. The one laser unit for example can comprise an excimer laser which uses a different combination of a noble gas and a reactive gas respectively for generating laser beams with different wave lengths. Any generally known kind of laser types can be integrated into the laser unit emitting different frequency of light waves. This allows adapting the frequency of the light waves to the condition at the surface of the objects in order to improve the created ultrasonic signal caused by the optoacoustic effect. Thereby the application possibilities are increased with respect to the used objects.

Generally, it is possible that more than one laser unit is provided wherein the laser units are located at different positions respectively, generating pulsed laser beams being directed to the same object respectively. The laser units can be arranged directly opposite each other or just located separated apart to direct their laser beams to the objects at different angles. The laser beam can be focussed on the same spot of said object to enhance the impact located on that spot. Optionally the laser beams can hit the object on different spots by what the generated ultrasonic signals can be emitted more equally in plural directions out of the object whereby the positioning of said object can be improved.

The invention further relates to a apparatus for marking an object by means of a marking unit comprising a transporting device for transporting the object and a marking unit for marking said objects and which further comprises a device described above.

Commonly the transporting device is designed as a conveyor belt on which the objects are moved relative to the marking unit and passing it to get marked. For positioning of said objects placed on the conveyor belt a device for determination of the position of said objects is provided as outlined above. Various kind of marking units can be used, such as labelling devices which marks the object by tagging, imprinting or embossing.

In an embodiment of the apparatus the marking unit is designed for generating a laser beam, said laser beam being directed to the object in order to mark. For generating the laser beam all kind of common laser types can be used such as gas lasers, in particular $CO_2$ laser, argon laser, excimer laser, solid-state laser or fiber laser.

The sign that is to be marked may be designed as a character, a picture, or single pixels of a graphic. The signs can be composed of a number of dots or lines. This can be put into practice by using gas lasers which are activated for short periods to produce dots on the objects or for a settable time period to cause lines of a certain length.

An embodiment of the invention is characterized in that more than one laser unit is provided wherein a first laser unit comprises a marking unit for generating a laser beam, said laser beam being directed to the object in order to mark said object, and a second laser unit is provided for generating a pulsed laser beam, said pulsed laser beam being directed to the object and adapted to cause at a surface of the object vibrations, by which the object is excited to generate ultrasonic signals.

In some cases, the first and the second laser units are different types of lasers wherein the second laser unit is able to generate a laser beam with higher energy than the laser beam of the first laser unit. The spatial arrangement of the laser units to each other is not determined. Both laser units can be apart from each other wherein their laser beams hitting the object at different spots of its surface.

In this way the region of the surface which is intended to be marked is not be effected by the pulsed laser beam generating said ultrasonic signal from the second laser unit. The single laser beams can be aligned parallel to each other or can be include various angles with each other. In addition to more than one marking unit could be provided to reduce the time for marking by what the throughput of the passing objects can be further enhanced.

In another embodiment of the apparatus according to the invention the at least one laser unit can be run in a first operation mode, in which a pulsed laser beam is generated, said pulsed laser beam being directed to the object and adapted to cause at a surface of the object vibrations, by which the object is excited to generate ultrasonic signals, and can be run in a second operation mode in which the object is marked by the laser beam generated by the at least one laser unit operating in the second operation mode.

This embodiment of the invention may just need one laser unit for marking the objects on the one hand and also generating the ultrasonic transmission signals for determination the position of said objects. This may by far simplify the arrangement and can lower the costs too. For example at the first operating mode the laser unit can generate a pulsed laser beam wherein the laser beam is pulsed with high peak power by Q-switching. The short pulsed laser peak has a greater impact in causing ultrasonic signals wherein particles can eject out of the surface of the object and/or enhance the temperature at the impact region. In contrast thereto the laser unit can be switched to a continuous wave mode with constant output wherein the object is marked by the laser beam scanning in that mode.

Q-switching can be done in an active way by a mechanical device such as a shutter or chopper wheel or it may be some form of modulator such as an acousto-optic device or an electro-optic device like a pockels cell or a kerr-cell. Also passive Q-switching is possible wherein the Q-switch is a saturable absorber, a material whose transmission increases when the intensity of light exceeds some threshold. Mode-locking can be also used for changing the operation mode of the laser unit.

For this appliance all common kinds of laser types can be used which are capable to operate in different operation modes wherein the generated laser beam can be adapted to mark said object in the first operation mode and generating ultrasonic signals by hitting said objects in a second operation mode.

An application for the laser unit can be a Q-switched laser, e.g. a Nd:YAG laser wherein the peak power of the pulsed laser beam is far higher than its average power.

Preferably an adjusting device may be provided for adjusting the laser beam generated by the at least one laser unit to direct the laser beam to the object, which is moved by the transporting device, based on the information about the position of the moved object which is transmitted from the computing device to the adjusting device. The laser beam can be positioned by moving or turning the laser unit or by XY-beam deflection which can be performed for example by galvo scanners.

The information about the position calculated by the computing device may be transmitted of any generally known kind of connection such as a electronic cable or by transmitting electrical signals or optical signals between a transmitter integrated in the computing device and a corresponding receiver as a part of the adjusting device.

The adjusting device ensures that the signs made by the marking unit are impinged at the correct portion and/or spot on the object's surface. The adjusting device also can be designed for vernier adjustment of the pulsed laser beam which generating the ultrasonic signals for determination of the position by the computing device.

BRIEF DESCRIPTION OF THE DRAWINGS

FIG. 1 shows a schematic diagram of a first embodiment of an inventive apparatus.

The invention will be further described with reference to the attached single FIGURE.

DETAILED DESCRIPTION OF THE INVENTION

FIG. 1 shows a schematic diagram of a first embodiment of an inventive apparatus 15 for marking an object comprising a marking unit and a device 10 for determination of a position of an object by means of ultrasonic waves.

Two laser units 20, 22 with gas lasers generate pulsed laser beams 85, which are deflected by two galvanometer scanners in order to set the required beam direction. By hitting the surface 55 of said object 50, preferably a glass or plastic bottle, the laser beam energy of said pulsed laser beams 85 causes a strong local heat-up at the point of impact 57.

This leads to local vibrations, wherein an ultrasonic signal 70 is emitted. The signal 70 can be detected by an ultrasonic sensor 30, preferably a transducer element. The received ultrasonic signals 70 are transformed into electrical signals which are transferred to computing means 40. The computing means 40 are designed for computing the position of the object 50 moved in the direction of the arrow 8 by the transporting device 64, for example a conveyor belt.

The calculated position of said object 50 on the transporting device 64 initiates to set the direction of a laser beam 80 emitted by a marking unit 25 to a point on the surface 55 of the object 50, where a mark or sign 52 is to be written. Additionally, if necessary, the pulsed laser beams 85 emitted by the laser units 20, 22 can be adjusted too. Depending on the characteristics of the surface 55 of the moved object 50 it can be done by craving or branding.

The invention claimed is:

1. An apparatus for marking an object, the apparatus comprising:
    a marking unit for marking the object by means of a laser beam;
    a transporting device for transporting the object; and
    a device for determination of a position of a transported object by means of ultrasonic waves, including at least one ultrasonic sensor for receiving ultrasonic signals from the object,
    wherein:
        at least one laser unit for generating a pulsed laser beam is provided, said pulsed laser beam being directed to the transported object and adapted to cause at a surface of the object vibrations, by which ultrasonic signals are generated, and
        computing means for computing the position of the object based on the received ultrasonic signals, wherein the laser beam for marking is directed to the object based on the computed position of said object.

2. The apparatus for marking an object according to claim 1, wherein the at least one laser unit is designed for generating more than one laser beam, wherein the frequency of the light waves of said laser beams differ from each other.

3. The apparatus for marking an object according to claim 1, wherein more than one laser unit is provided, wherein the laser units are located at different positions respectively, generating pulsed laser beams being directed to the same object.

4. The apparatus for marking an object according to claim 1, wherein:
    more than one laser unit is provided wherein a first laser unit is provided for said marking unit for generating a laser beam, said laser beam being directed to the object in order to mark said object, and
    a second laser unit is provided for generating a pulsed laser beam,
    said pulsed laser beam being directed to the object and adapted to cause at a surface of the object vibrations, by which the object is excited to generate ultrasonic signals.

5. The apparatus for marking an object according to claim 1, wherein:
    the at least one laser unit can be run in a first operation mode, in which a pulsed laser beam is generated, said pulsed laser beam being directed to the object and adapted to cause at a surface of the object vibrations, by which ultrasonic signals are generated, and can be run in a second operation mode in which the object is marked by the laser beam generated by the at least one laser unit operating in the second operation mode.

6. The apparatus for marking an object according to claim 1,
    wherein:
    an adjusting device is provided for adjusting the laser beam generated by the at least one laser unit to direct the laser beam to the object, which is moved by the transporting device, based on the information about the position of the moved object which is transmitted from the computing means to the adjusting device.

7. A method for marking an object, comprising:
    transporting the object to be marked by means of a transporting device, and determining the position of the transported object by means of ultrasonic waves, wherein:
        a pulsed laser beam is generated by at least one laser unit, said laser beam is directed to the transported object,
        by means of the pulsed laser beam at a surface of the transported object vibrations are caused, by which the object is excited to generate ultrasonic signals,
        the ultrasonic signals are received from the object by at least one ultrasonic sensor, and
        based on the received ultrasonic signals the position of the object to be marked it computed.

8. The method according to claim 7, wherein:
    the object is marked by at least one laser beam, and
    the laser beam is directed to the object based on the computed position of said object.

9. The method according to claim 7, wherein a marking apparatus is used to mark the object, the marking apparatus including:
    a marking unit for marking the object by means of the laser beam;
    the transporting device for transporting the object; and
    a device for determination of the position of the transported object by means of the ultrasonic waves, including at least one ultrasonic sensor for receiving ultrasonic signals from the object,
    wherein:
        the at least one laser unit generates the pulsed laser beam, and
        computing means for computing the position of the object based on the received ultrasonic signals, wherein the laser beam for marking is directed to the object based on the computed position of said object.

* * * * *